J. P. SMITH.
Thrashing-Machine.

No. 222,319.  Patented Dec. 2, 1879.

WITNESSES:
Chas. Nida
C. Sedgwick

INVENTOR:
J. P. Smith
BY
ATTORNEYS.

UNITED STATES PATENT OFFICE.

JOHN P. SMITH, OF CLAVERACK, NEW YORK.

IMPROVEMENT IN THRASHING-MACHINES.

Specification forming part of Letters Patent No. 222,319, dated December 2, 1879; application filed June 19, 1879.

*To all whom it may concern:*

Be it known that I, JOHN P. SMITH, of Claverack, in the county of Columbia and State of New York, have invented a new and useful Improvement in Thrashing-Machines, of which the following is a specification.

Figure 1:
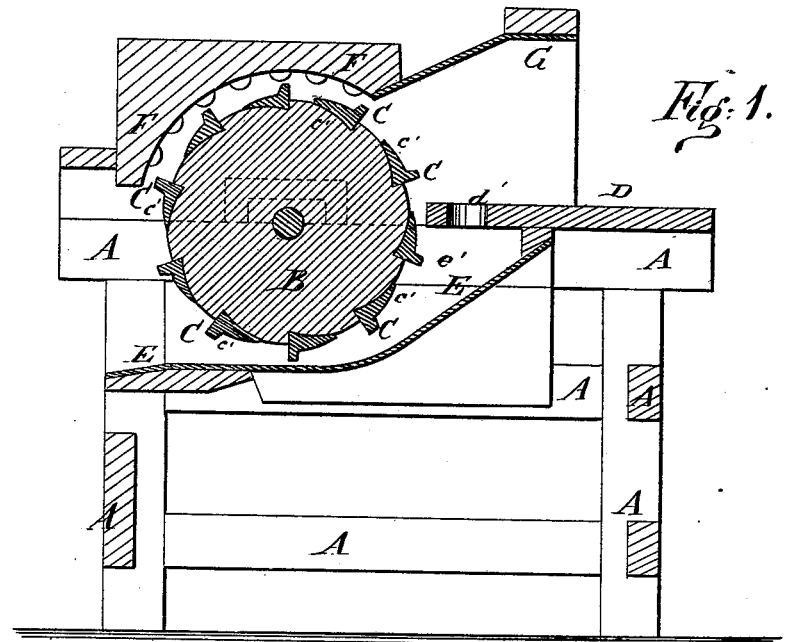
Figure 2:
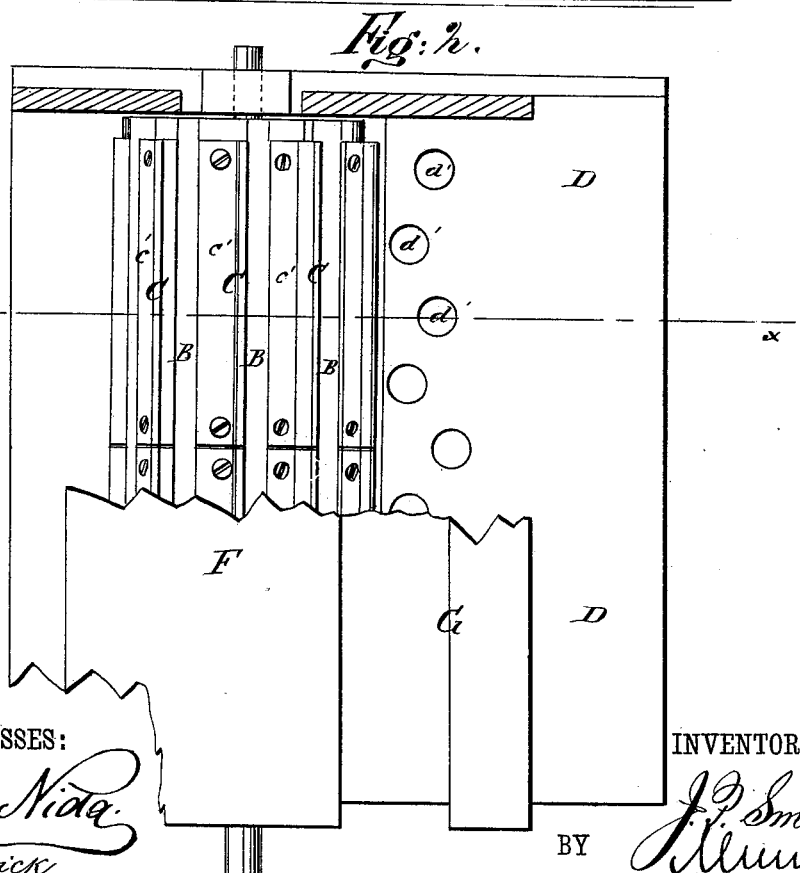

Figure 1 is a vertical section of my improved machine, taken through the line $x\ x$, Fig. 2. Fig. 2 is a top view of the same, partly in section, to show the construction.

Similar letters of reference indicate corresponding parts.

The object of this invention is to improve the construction of the thrashing-machine for which Letters Patent No. 53,694 were issued to me April 3, 1866, in such a way as to make it more convenient in use, and more rapid and effective in operation.

The invention consists in so combining a perforated apron and concaves with the rotary cylinder of a thrasher as to create an upward blast through the apron to lift and assist in carrying the straw to the cylinder.

A represents the frame of the machine. B is the thrashing-cylinder, the journals of which revolve in bearings attached to the frame A. The cylinder B is made of wood, and to it are attached, say, ten metal ribs, C. The ribs C are made with flanges $c'$ upon the forward side of their bases, through which are formed holes to receive the screws or bolts by means of which the said ribs are secured to the said cylinder. The bases of the ribs C are set in grooves in the face of the cylinder B. With this construction the flanges $c'$ not only strengthen the ribs C, but they prevent the cylinder B from being worn by the friction of the grain as it is being thrashed.

To the forward part of the frame A is attached the feed-apron D, which is placed horizontally and at a slightly higher level than the center of the cylinder B. The inner part of the feed-apron D has a number of perforations, $d'$, formed through it for the passage of air.

E is the lower concave, which is made smooth, and is extended to meet the lower side of the feed-apron D, in front of its perforations $d'$, to form an air-chamber, $e'$, into which air is driven by the revolution of the cylinder B, and from which it escapes through the perforations $d'$ in the said apron D, raising the grain and causing it to pass in between the said cylinder B and the upper concave, F, the feeding of the grain being assisted by the suction between the cylinder B and the upper concave, F, caused by the revolution of the said cylinder B. The upper concave, F, is provided with semi-spherical projections or teeth, and the said concave F is extended downward upon the rear side of the cylinder B, nearly to a level with the upper surface of the feed-apron D, as shown in Fig. 1. The inner part of the feed-apron D is covered with a cover or hood, $g$, as shown in Fig. 1, to confine the grain as it is being fed to the machine, and especially to confine the air-blast as it rises through the perforations $d'$ of the apron D, and cause it to act upon the grain more perfectly than if it was allowed to spread out and escape as it rises through the said perforations $d'$.

Having thus described my invention, I claim as new and desire to secure by Letters Patent—

The apron D, provided with perforations $d'$, and conjoined with concave to form air-chamber $e'$, in combination with the rotary toothed cylinder and upper concave having extension or hood G, as shown and described, for the purpose specified.

JOHN POUCHER SMITH.

Witnesses:
F. C. HAVILAND,
RICHARD MACY.